(12) United States Patent
Yu et al.

(10) Patent No.: US 6,416,688 B1
(45) Date of Patent: Jul. 9, 2002

(54) HIGH LUMINANCE BLUE COLOR FLUORESCENT SUBSTANCE FOR LOW-VOLTAGE AND MANUFACTURING METHOD OF THE SAME

(75) Inventors: Il Yu, Kyungki-do; Yong-Chan You, Seoul; Mi-ran Song, Kyungki-do, all of (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/615,133

(22) Filed: Jul. 13, 2000

(30) Foreign Application Priority Data

Jul. 16, 1999 (KR) .............................................. 99-28990

(51) Int. Cl.$^7$ ............................................. C09K 11/62
(52) U.S. Cl. ......................... 252/301.6 R; 252/301.6 P
(58) Field of Search ................... 252/301.6 R, 301.6 P

(56) References Cited

U.S. PATENT DOCUMENTS

| 5,051,203 A | * | 9/1991 | Toki et al. ............ 252/301.6 R |
| 5,478,499 A |   | 12/1995 | Satoh et al. .......... 252/301.6 P |

* cited by examiner

Primary Examiner—C. Melissa Koslow
(74) Attorney, Agent, or Firm—Christie, Parker & Hale, LLP

(57) ABSTRACT

Disclosed is a low-voltage blue color fluorescent substance which is doped with 0.5 to 3 weight % of P, and a manufacturing method of the same. The above blue color fluorescent substance is manufactured by mixing phosphoric compound as flux with a mixture of zinc oxide (ZnO) and gallium oxide ($Ga_2O_3$); carrying out a primary burn on the mixture at a temperature of 1,200 to 1,300° C.; ball milling and washing; and carrying out a secondary burn on the resultant material at a temperature of 900 to 1,100° C., and then classifying the substance.

3 Claims, 1 Drawing Sheet

HIGH LUMINANCE BLUE COLOR FLUORESCENT SUBSTANCE FOR LOW-VOLTAGE AND MANUFACTURING METHOD OF THE SAME

CROSS REFERENCE TO RELATED APPLICATION

This application is based on application No. 99-28990 filed in the Korean Industrial Property Office on Jul. 16, 1999, the content of which is incorporated hereinto by reference.

BACKGROUND OF THE INVENTION (a) Field of the Invention

The present invention relates to a low-voltage blue color fluorescent substance and a manufacturing method of the same, more particularly, to a luminance improved low-voltage blue color fluorescent substance for a Field Emission Display (FED) or a Vacuum Fluorescent Display (VFD), and a manufacturing method of the same.

(b) Description of the Related Art

Low-voltage displays rated at one kilo volt (kV) or less mainly include Field Emission Displays (FED), Vacuum Fluorescent Displays (VFD), etc. The Field Emission Display is actively being studied as a next generation small sized Flat Panel Display (FPD) component, and the Vacuum Fluorescent Display (VFD) is mainly being used as a variety of display components for household electric appliances, audios and videos (AV), automobiles, etc. These low-voltage display panels are constructed so that electrons emitted from an electron emitter such as a heating wire irradiate fluorescent substances resulting in the production of desired images.

Fluorescent substances for low-voltage driven device such as Field Emission Displays, Vacuum Fluorescent Displays, etc. should have low electrical resistance, low luminescence initiating voltages, high luminescence efficiency, no luminance saturation, minimal defects on the fluorescent substance particle surface, stable low-velocity electron excitation luminescence conditions, and do not undergo decomposition. Currently, a sulfide based fluorescent substance is widely used as a fluorescent substance for low-voltage driven device. As the host materials of sulfide based fluorescent substances have high resistance, conductive materials are added to these substances so that they can be used in low-velocity electron-beam excitation applications. However, non-sulfide based fluorescent substances are actively being developed as there are problems of oxide filament contamination and fluorescent substance efficiency deterioration due to sulfide based gas emission and fluorescent substance material decomposition scattering during electron-beam excitation.

$ZnGa_2O_4$ is a notable fluorescent substance as it has relatively superior luminance and exhibits a stable blue color. $ZnGa_2O_4$, as a complex oxide of ZnO and $Ga_2O_3$, has an optical band gap of about 4.4 electron volt (eV). During electron-beam excitation, the electron does not directly excite the center of the fluorescent material, but first excites the host material of the fluorescent material and this energy is transferred to the center of the fluorescent material to cause luminescence.

A low-voltage blue color fluorescent substance is manufactured through a process comprising the steps of mixing raw materials with flux; performing a primary burn; ball-milling and washing; and the performing of a secondary burn and classification. Flux can be added to increase particle diameter during the burning. It is known that even though flux needs to be added in order to improve luminance of sulfide based fluorescent substances, luminance rather deteriorates when using flux with other fluorescent substances. Additionally, U.S. Pat. No. 5,478,499 discloses the blue colored fluorescent material ZnO $Ga_2O_3$ that is luminescent below 100V and which is doped with 800 to 2,300 parts per million (ppm) of lithium (Li) and 100 ppm of phosphorous (P) or less. However, the degree of luminance improvement of this disclosure is minute.

SUMMARY OF THE INVENTION

It is an object of the present invention to provide a low-voltage blue color fluorescent substance having an excellent luminance improvement effect and a manufacturing method of the same by including an appropriate amount of P on the fluorescent substance's surface.

In order to accomplish the above object, the present invention is manufactured so that the amount of P in a fluorescent substance composed of zinc oxide and gallium oxide should amount to 0.5 to 3 weight %.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, wherein.

DETAILED DESCRIPTION OF THE PREFERRED EMBODIMENTS

Figure 1:
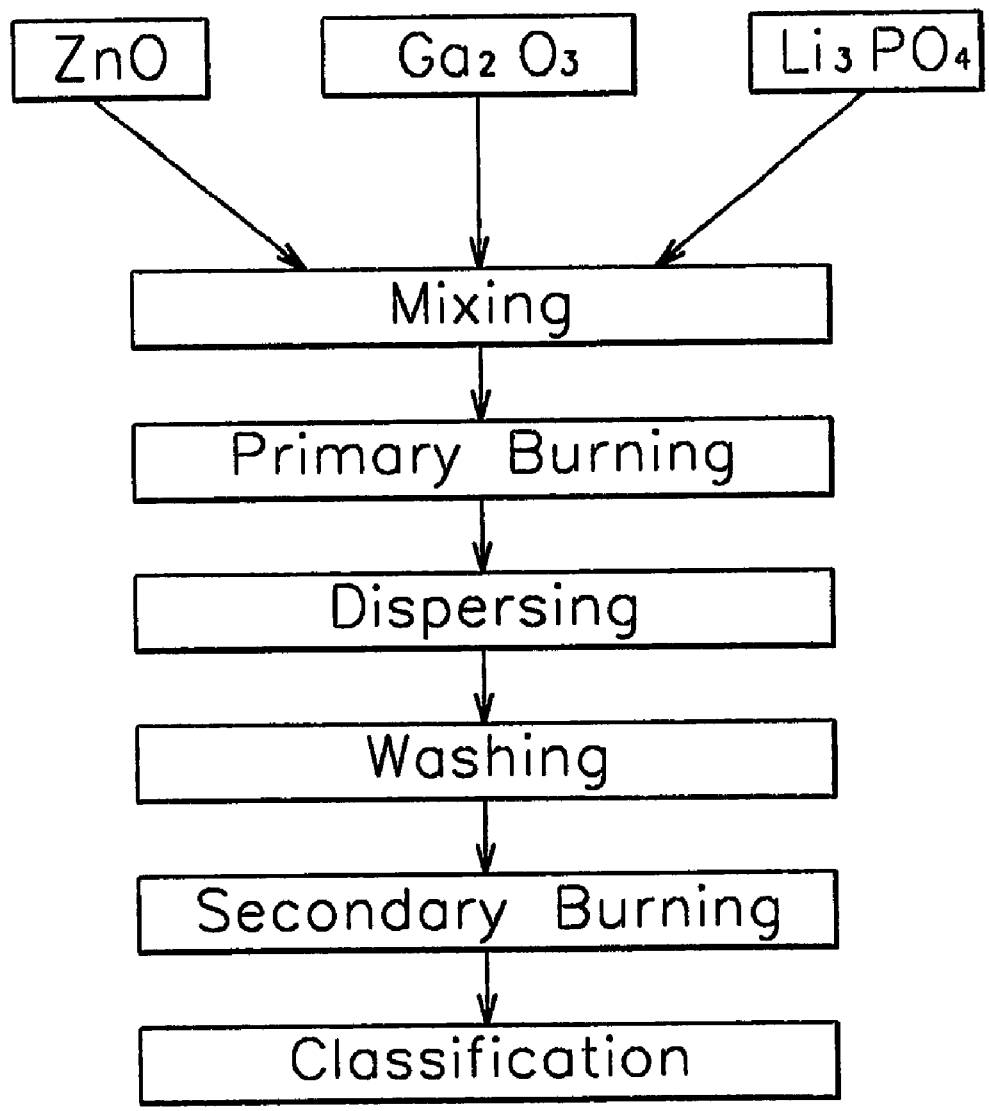
FIG. 1 is a manufacturing process diagram of a low-voltage blue color fluorescent substance of the present invention.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The present invention is described particularly in detail below by referring to a manufacturing process diagram in FIG. 1.

As the first step of the blue color fluorescent substance manufacturing process of the present invention, a phosphoric compound as a flux is added to a mixture of zinc oxide (ZnO) and gallium oxide ($Ga_2O_3$), and then mixed well using a mortar. The mole ratio of ZnO:$Ga_2O_3$ is preferably 1:1. A phosphoric compound which is used as the above flux includes $Li_3PO_4$, $Na_3PO_4$, etc. A phosphoric compound used as the above flux increases the particle diameter or adjusts particle shape, and some of the phosphorous remains on the fluorescent substance acting as a sub-activation material. It is preferable that 10 to 60 mole % of phosphoric compound is used with the oxide matrix, and it is more preferable that 30 mole % of phosphoric compound is used.

As the second step, a primary burn is carried out on the above mixture at a temperature of 1,200 to 1,300° C. for 2 to 3 hours. The above burning process is preferably carried out at a temperature of 1,200° C. for about 3 hours in an air atmosphere. ZnO. $Ga_2O_3$ material is formed through this primary burning process.

The primary burning materials are then subject to milling for about 3 to 4 hours, preferably for 3 hours in order to remove agglomerated particles and improve dispersion and particle distribution.

The milling processed materials are washed with nitric acid or hydrochloric acid for half to one hour. The concentration of nitric acid is preferably 0.5 N, and that of hydrochloric acid is 1%. Effects on the host material during a secondary burn can be prevented by removing excessive amounts of flux through this process.

The secondary burn is carried out on the above washed material at a temperature of 900 to 1,100° C. for 1 to 3 hours. It is preferable that the burning process takes place at a temperature of about 1,100° C. for 2 hours in a reducing atmosphere in order to improve conductivity by making a deficient oxygen environment. The above reducing atmosphere is adjusted so that $H_2$ gas and $N_2$ gas exist as a ratio of 5:95.

The material which was subject to the secondary burning is then subject to classification using a sieve in order to thereby manufacture a low-voltage blue color fluorescent substance. Luminescence efficiency can be improved by increasing crystallizability and self-activation of the fluorescent substance through this secondary burning process. The remaining amount of P in the manufactured blue color fluorescent substance is preferably from 0.5 to 3 weight %, however, the degree of luminance improvement is minute when it exceeds this range.

The following preferable examples are offered to help in the gaining of an understanding of the present invention. However, the following examples are provided only for assistance in easily understanding the present invention, and the present invention is not restricted to the following examples.

EXAMPLES and COMPARATIVE EXAMPLES

Example 1 to 5

ZnO and $Ga_2O_3$ were mixed at a mole ratio of 1:1, and the mixture was well mixed after adding 30 mole % of $Li_3PO_4$, and the primary burn was carried out on the resultant mixture at a temperature of 1,200° C. for 3 hours. The material was subsequently subjected to ball milling with the resultant material washed with 1% hydrochloric acid, and the secondary burn was carried out at a temperature of 1,100° C. for 2 hours, to thereby manufacture blue color fluorescent substance $ZnGa_2O_4$.

Comparative Example 1

Except for the fact that the resultant material was washed with 5% hydrochloric acid, the blue color fluorescent substance $ZnGa_2O_4$ was manufactured in the same method as in the above EXAMPLES.

Comparative Example 2

Commercially available $ZnGa_2O_4$ fluorescent substance from the Futaba Corporaton was bought and used as COMPARATIVE EXAMPLE 2.

The amount of P remaining in the $ZnGa_2O_4$ blue color fluorescent substances of the above EXAMPLES 1 to 5 and COMPARATIVE EXAMPLES 1 to 2 was measured with an inductive coupled plasma-atomic emission spectrometer (ICP-AES) method, and the results of these measurements were recorded in the following Table 1. Commission Internationale de l'Eclairage (CIE) chromaticity coordinates and relative luminance were measured for the blue color fluorescent substances of EXAMPLES 1 to 5 and COMPARATIVE EXAMPLES 1 to 2 at a driving voltage of 27 V, and the results of these measurements were also recorded in the following Table 1.

TABLE 1

| | | Amount of P remaining in the fluorescent substance | Chromaticity coordinates X | Y | Relative luminance (%) |
|---|---|---|---|---|---|
| EXAMPLES | 1 | 0.5 weight % | 0.18 | 0.17 | 110 |
| | 2 | 1.3 weight % | 0.18 | 0.17 | 120 |
| | 3 | 2.0 weight % | 0.18 | 0.17 | 120 |
| | 4 | 2.5 weight % | 018 | 0.17 | 120 |
| | 5 | 3.0 weight % | 0.18 | 0.17 | 110 |
| COMPARATIVE | 1 | 0.005 weight % | 0.18 | 0.17 | 90 |
| EXAMPLES | 2 | 0.01 weight % | 0.18 | 017 | 100 |

The relative luminance of a low-voltage blue color fluorescent substance according to the present invention turned out to have been increased more than 20% when compared with the existing fluorescent substances due to the adjusting of the remaining amount of P to between 0.5 to 3 weight %.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A low-voltage blue color fluorescent substance, wherein 0.5 to 3 weight % of P is doped on a fluorescent substance comprised of zinc oxide and gallium oxide.

2. A low-voltage blue color fluorescent substance in accordance with claim 1, wherein the above zinc oxide is ZnO, gallium oxide is $Ga_2O_3$, and the mole ratio of zinc Poxide:gallium oxide is approximately 1:1.

3. A manufacturing method of a low-voltage blue color fluorescent substance comprising the processes of:

a) adding a phosphoric compound as flux to a mixture of zinc oxide and gallium oxide, and mixing, wherein the phosphoric compound is added in a concentration sufficient to yield a fluorescent substance doped with 0.5 to 3 weight % P;

b) carrying out a primary burn on the above mixture at a temperature of 1,200 to 1,300° C. for 2 to 3 hours;

c) dispersing by milling the material which is subjected to the above primary burn;

d) washing the above dispersed material with an acid selected from the group consisting of nitric acid and hydrochloric acid;

e) carrying out a secondary burn on the above washed material at a temperature of 900 to 1,100° C. for 1 to 3 hours; and f) carrying out classification on the above material which was subject to the above secondary bum.

* * * * *

UNITED STATES PATENT AND TRADEMARK OFFICE
CERTIFICATE OF CORRECTION

PATENT NO.     : 6,416,688 B1
DATED          : July 9, 2002
INVENTOR(S)    : Il Yu, Yong-Chan You and Mi-Ran Song It is certified that error appears in the above-identified patent and that said Letters Patent is hereby corrected as shown below:

Column 4,
Line 42, replace "zinc Poxide:gallium oxide" with -- zinc oxide:gallium oxide --

Signed and Sealed this

Twenty-fifth Day of March, 2003

JAMES E. ROGAN
*Director of the United States Patent and Trademark Office*